United States Patent [19]

Hautau

[11] 4,134,305
[45] Jan. 16, 1979

[54] APPARATUS FOR INTERMITTENTLY ROTATING AND MOVING A MEMBER

[76] Inventor: Charles F. Hautau, 146 Hilltop Rd., Oxford, Ohio 45056

[21] Appl. No.: 795,896

[22] Filed: May 11, 1977

Related U.S. Application Data

[62] Division of Ser. No. 575,256, May 7, 1975, Pat. No. 4,024,963.

[51] Int. Cl.² .............................................. F16H 27/04
[52] U.S. Cl. ...................................................... 74/24
[58] Field of Search ...................... 74/24, 23, 22 R, 21

[56] References Cited

U.S. PATENT DOCUMENTS

| 255,237 | 3/1882 | Barber | 74/24 |
|---|---|---|---|
| 286,225 | 10/1883 | Richards | 74/24 |
| 304,727 | 9/1884 | Hayworth et al. | 74/24 |
| 340,156 | 4/1886 | Richards | 74/24 |
| 340,248 | 4/1886 | Richards | 74/24 |
| 1,536,303 | 5/1925 | Miller | 74/24 |
| 2,949,789 | 8/1960 | Eminger | 74/24 X |
| 3,990,316 | 11/1976 | Risi | 74/24 |

Primary Examiner—William H. Schultz
Attorney, Agent, or Firm—Jacox & Meckstroth

[57] ABSTRACT

A rotary transfer member carries means for picking up a sheet-like article from the top of a supply stack supported within a hopper having an open top and an open bottom. An indexing mechanism includes means for intermittently rotating an output shaft in response to a continuously driven input shaft, and the transfer member is supported for rotation with the output shaft and also for axial movement relative to the output shaft. The transfer member is moved axially in response to linear movement of a follower which engages a cam connected for continuous rotation with the input shaft. Supply stacks of articles are successively elevated into the hopper from an index table by a power driven jack mechanism, and a set of magnets are positioned adjacent the hopper for magnetically spreading and spacing the articles within the upper portion of the supply stack within the hopper.

3 Claims, 5 Drawing Figures

U.S. Patent  Jan. 16, 1979  4,134,305
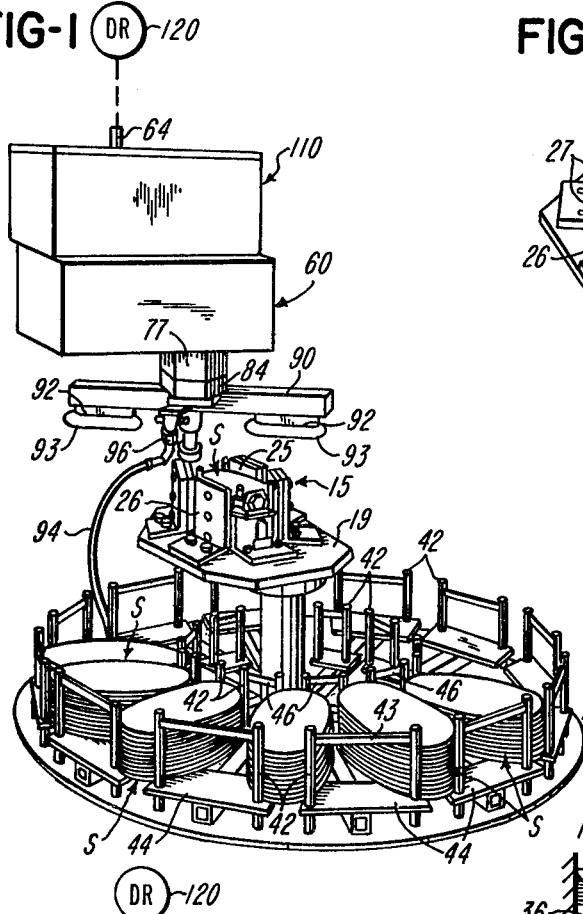
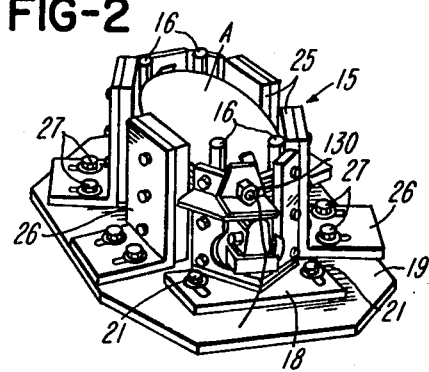
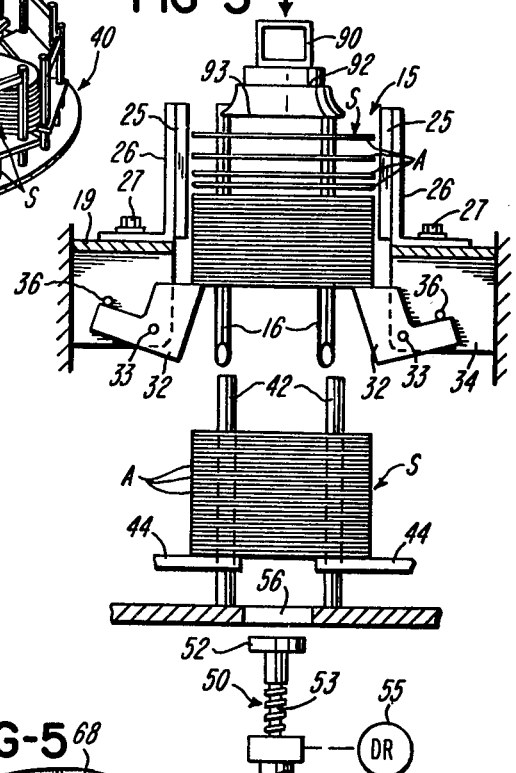
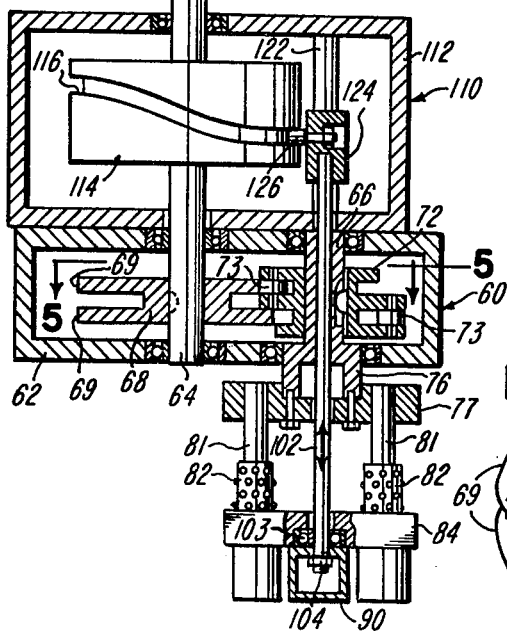
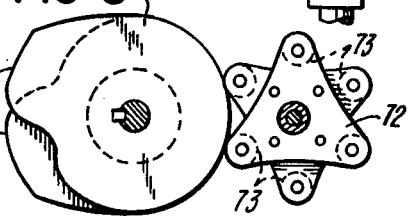

APPARATUS FOR INTERMITTENTLY ROTATING AND MOVING A MEMBER

RELATED APPLICATION

This application is a division of application Ser. No. 575,256, filed May 7, 1975, issued as U.S. Pat. No. 4,024,963.

BACKGROUND OF THE INVENTION

In the feeding or supply of metal sheet-like articles or blanks to a machine or press where one or more operations are performed on each article, it is commonly desirable to supply or transfer the articles to the press in a successive manner and at a high rate of speed so that optimum performance can be obtained from the press. It is also desirable for the feeding or transfer mechanism to operate in a continuous and dependable manner without interruption so that there is no down time of the press which receives the articles.

Frequently, it is necessary to supply or feed sheet-like articles such as flat blanks to a press by picking up each sheet from the top of a supply stack, moving the sheet laterally or horizontally to a predetermined location and then lowering the sheet onto a feeding mechanism which successively feeds the blanks or sheets into the press. Furthermore, it is usually desirable for the articles or sheets to be transferred from the supply stack to the press in precise timed relation with the operation of the press.

SUMMARY OF THE INVENTION

The present invention is directed to improved apparatus for successively transferring articles from a storage or supply station to another station where the article receives one or more operations. Apparatus of the invention is particularly adapted for successively transferring articles at a high speed and in timed sequence with another power driven machine and is also adapted for dependable operation so that the articles are transferred without skipping or interruption. In addition, the apparatus of the invention provides for precision movement of each article along a predetermined path and for precisely positioning the article at a receiving station.

Other advantages and features of the invention and the specific construction of one embodiment will be apparent from the following description, the accompanying drawing and the appended claims.

BRIEF DESCRIPTION OF THE DRAWING

FIG. 1 is a perspective view of apparatus constructed in accordance with the invention for successively transferring articles from supply stacks to a receiving station;

FIG. 2 is an enlarged perspective view of the hopper forming part of the apparatus shown in FIG. 1;

FIG. 3 is a diagramatic vertical section of the lower portion of the apparatus shown in FIG. 1;

FIG. 4 is a diagramatic vertical section of the upper portion of the apparatus shown in FIG. 1; and FIG. 5 is a fragmentary section taken generally on a line 5—5 of FIG. 4 and showing the indexing mechanism used in the apparatus.

DESCRIPTION OF THE PREFERRED EMBODIMENT

The apparatus illustrated in FIG. 1 is adapted for successively transferring articles A in the form of flat oval metal blanks on sheets from a supply stack S to a mechanism (not shown) for feeding a press having a die set for forming each sheet into an end wall of a muffler. However, while each article A is illustrated in the form of a flat oval blank or sheet, it is to be understood that the article may be of a different shape or configuration.

As shown in FIGS. 2 and 3, the stack S of flat ferrous metal sheets A are confined within a hopper 15 formed by two sets or pairs of vertical guide rods 16 positioned at opposite ends of the stack. Each pair of guide rods 16 is supported by an L-shaped bracket 18 which is mounted on a horizontal support plate or platform 19 for lateral or horizontal adjustment by a set of screws 21 extending through corresponding slots within the base portion of the bracket. A set of four rectangular permanent magnets 25 are supported in horizontally spaced generally opposing relation on opposite sides of the stack S by corresponding L-shaped brackets 26 which are also secured to the platform 19 by sets of screws 27 extending through corresponding slots within the base of the brackets 26.

Preferably, the magnets 25 are of the type manufactured and marketed by Bunting Magnetics Co., Franklin Park, Ill. and are effective to induce a magnetic field within the sheets A so that the sheets within the upper portion of the stack are separated and spaced vertically apart in a logarithmic manner and the sheets remain in parallel vertically spaced relation. This magnetic separation of the sheets within the upper portion of the stack assures that two adjacent sheets do not stick together as a result of oil or other forms of surface adhesion.

A set of four dogs or pawls 32 are positioned adjacent the bottom of the hopper 15, and each pawl 32 is pivotally supported by a corresponding horizontal pin 33 secured by a bracket 34 depending from the stationary platform 19. The pivot pins 33 are located so that the weight of each pawl 32 normally positions the pawl as shown in FIG. 3 where the pawl engages the bottom article or sheet A within the stack S and rests against a corresponding stop pin 36.

A rotary indexing transport member or table 40 is positioned below the hopper 15 and includes sets of upwardly projecting rods 42 which are interconnected by cross-members 43, 44 and 46 to form nests for receiving a plurality of supply stacks S of sheet A. The stacks S are angularly arranged in a spoke-like manner on the annular table 40, and are successively located or positioned directly under the hopper 15 in response to indexing of the table 40 by a suitable power indexing drive (not shown).

A mechanical elevator or jack actuator 50 (FIG. 3) is positioned below the transport table 40 and under the hopper 15, and includes a circular head member 52 secured to the upper end of a helical ball screw 53 which receives recirculating balls (not shown) confined within a rotary nut driven by a reversible drive motor 55. Preferably, the jack actuator 50 is of the ball screw actuator type, for example, as manufactured and marketed by Duff-Norton Company, Charlotte, N.C. A set of circular holes 56 are formed within the indexing table 40 directly under the centers of the stacks S of sheets A, and each hole 56 is adapted to receive the head 52 of the jack actuator 50 when the head member 52 is raised for elevating a stack of articles on the table 40 into the hopper 15.

Referring to FIGS. 1 and 4, a rotary indexing unit or mechanism 60 includes a housing 62 which is mounted on a frame (not shown) and supports a rotatable input shaft 64 and a rotatable tubular output shaft 66. Preferably, the general construction of the indexing unit or mechanism 60 is similar to that shown in U.S. Pat. No. 2,986,949 which issued to Commercial Cam and Machine Company, Chicago Ill. The indexing mechanism 60 provides for indexing the output shaft 66 in angles of predetermined degrees in response to continuous rotation of the input shaft 64. A double cam member 68 is secured to the input shaft 64 for rotation therewith and has outer peripheral cam surfaces 69. A cam follower 72 includes a plurality of axially spaced sets of rollers 73 for engaging the outer cam surfaces 69 of the cam members 68. The cam member 68 and the cam follower member 72 cooperate to prevent back lash or relative play when the follower member 72 is rotatably indexed in response to continuous rotation of the cam member 68 and thus provides for precision rotation of the output shaft 66.

The output shaft 66 includes an enlarged cylindrical lower portion 76 which supports an elongated upper plate 77. A pair of parallel spaced vertical guide rods 81 have their upper end portions rigidly secured to the plate 77 and project downwardly into corresponding antifriction sleeve-type ball bearings 82 which are supported by an elongated lower plate 84. Thus the plates 77 and 84 rotate with the output shaft 66 of the indexing mechanism 60, and the lower plate 84 is supported for vertical movement relative to the upper plate 77. Preferably, the plates 77 and 84 are constructed of aluminum to minimize their mass.

An elongated transfer member or arm 90 has its center portion rigidly secured to the lower plate 84, and a pair of oval shaped suction units 92 (FIG. 1), having resilient oval lips 93, are secured to the opposite end portions of the transfer arm 90. Compressed air is supplied to the transfer arm 90 through an air supply tube 94 (FIG. 1) and a rotary union 96 located on the axis of rotation, and the compressed air is passed through a venturi to generate a suction within each suction unit 92 when it is positioned over the hopper 15. The pressurized air supply is also alternately supplied directly to each suction unit 92 when it is positioned 180° from the hopper 15, as will be explained later.

Referring to FIG. 4, an elongated vertical rod 102 extends through the tubular output shaft 66 of the indexing mechanism 60 and has its lower end portion connected to the lower plate 84 through an anti-friction thrust bearing 103 and a nut 104. A linear actuating unit or mechanism 110 includes a box-like housing 112 which is secured to the housing 62 of the indexing mechanism 60 and encloses a cylindrical barrel-type cam member 114 which has a peripherally extending cam groove or surface 116. The cam member 114 is rigidly secured or connected to the input shaft 64 of the indexing mechanism 60 and is driven with the cam member 68 at a constant rpm by a drive unit 120.

The housing 112 of the linear actuating mechanism 110 also supports a pair of horizontally spaced vertical guide rods 122 which receive a corresponding pair of sleeve-type anti-friction ball bearings (not shown) retained within a follower block 124 rigidly connected to the upper end portion of the actuating rod 102. The block 124 supports a roller-type cam follower member or element 126 which projects horizontally into the cam groove 116 of the cam member 114.

In operation of the article transfer apparatus described above, the input shaft 64 is driven at a constant speed by the drive 120 which may be an extension from the main drive of another machine such as a punch press. The cam members 68 and 114 are designed so that the output shaft 66 is indexed in increments of 180° with a dwell between each indexing movement. The cam member 114 produces vertically reciprocating movement of the plate 84 and the transfer arm 90 during each dwell of the indexing mechanism 60. When the transfer arm 90 descends, the suction unit 92 overlying the hopper 15 is effective to pick up the uppermost blank or sheet A on the stack S within the hopper 15. After the transfer arm 90 ascends to the position where the lower plate 84 is substantially adjacent the upper plate 77, the transfer arm is rotated or indexed 180° by the mechanism 60 so that the blank or sheet A is carried to a receiving station, for example, above a feed mechanism (not shown) which successively feeds the sheets into a punch press.

When the transfer arm 90 again descends, air pressure is created within the suction unit 92 at the receiving station so that the transferred sheet A is released from the suction unit and deposited on the sheet feeding mechanism. Simultaneously, the suction unit 92 on the opposite end of the transfer arm 90 picks up the uppermost sheet A within the stack S within the hopper 15 as a result of a suction created in the suction unit, and the cycle is repeated. As mentioned above, successive stacks of blanks or sheets A are supplied to the hopper 15 in response to a proximity sensor 130 which senses the level of the sheets A within the hopper 15 and controls the operation of the indexing drive for the table 40 and the drive 55 for operating the jack actuator 50.

From the drawings and the above description, it is apparent that transfer apparatus constructed in accordance with the present invention, provides desirable features and advantages. For example, the combination of the rotary indexing unit or mechanism 60 and the linear actuating unit or mechanism 110 provides for a precision high speed transfer of a succession of articles when it is desirable to transfer each article along a path which requires vertical or "X" movement as well as horizontal or "Y" movement. Furthermore, the combined mechanisms produce the X-Y transfer path at a high speed in response to continuous rotation of the input shaft 64. For example, it has been found that the combined mechanisms provide for easily transferring metal blanks or sheets A at a speed of one sheet per second and for depositing each sheet in a precise position at the receiving station. In addition, the two separate cam members 68 and 114 provide for conveniently and independently selecting or changing the "X" path and the "Y" path to produce a desired transfer path. It is also understood that the rotary indexing mechanism 60 may be constructed to produce intermittent rotary oscillatory movement as well as intermittent rotary indexing movement.

As another important advantage, the mechanisms 60 and 110 cooperate with the article supply hopper 15 and article spacing magnets 25 to assure that the articles or sheets are successively transferred in a rapid manner without interruptions and with optimum dependability so that continuous operation of the press which receives the articles is assured.

While the indexing mechanism 60 and the linear actuating mechanism 110 are illustrated in a machine for successively transferring flat sheets A from the supply hopper 15, it is apparent that the combined mechanisms may be used in other machines or apparatus which require X-Y transferring or advancement of one or more articles. Furthermore, while the form of transfer apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for intermittently rotating a head member and for also moving said head member in an axial direction, comprising an input shaft and a tubular output shaft supported for rotation in parallel spaced relation, a first cam mounted on said input shaft, a rotatable cam follower mounted on said tubular output shaft and engaging said first cam for intermittently rotating said output shaft in response to continuous rotation of said input shaft, means mounted on said output shaft and supporting said head member for rotation with said output shaft and for reciprocating axial movement relative to said output shaft, a rod member extending through said output shaft and connected to said head member for reciprocation within said output shaft, a generally cylindrical cam mounted on said input shaft for continuous rotation therewith, said cylindrical cam having a peripheral cam surface disposed generally adjacent the reciprocating path of said rod member, and a cam follower mounted on said rod member and engaging said peripheral cam surface for reciprocating said rod member and said head member in response to said continuous rotation of said input shaft.

2. Apparatus as defined in claim 1 wherein said first cam comprises a set of axial spaced disk-like cam element each having a peripheral cam surface, said rotatable cam follower mounted on said tubular output shaft including means for engaging said peripheral cam surfaces, and said cam elements follower cooperating with said cam to produce rotary indexing movement of said output shaft in one direction in response to said continuous rotation of said input shaft.

3. Apparatus for intermittently rotating a head member and for also moving said head member in an axial direction, comprising an input shaft and a tubular output shaft supported for rotation in parallel spaced relation, a first cam mounted on said input shaft, a rotatable cam follower mounted on said tubular output shaft and engaging said first cam for intermittently rotating said output shaft in response to continuous rotation of said input shaft, means mounted on said output shaft and supporting said head member for rotation with said output shaft and for reciprocating axial movement relative to said output shaft, a rod member extending through said output shaft and connected to said head member for reciprocation within said output shaft, a generally cylindrical cam mounted on said input shaft for continuous rotation therewith, said cylindrical cam having a peripheral cam surface disposed generally adjacent the reciprocating path of said rod member, a cam follower mounted on said rod member and engaging said peripheral cam surface for reciprocating said rod member and said head member in response to said continuous rotation of said input shaft, said means mounted on said output shaft and supporting said head member including a plurality of parallel spaced guide rods, and a corresponding plurality of reciprocating bearings mounted on said guide rods and supporting said head member for said reciprocating movement.

* * * * *